United States Patent [19]
Futagawa et al.

[11] 3,795,849
[45] Mar. 5, 1974

[54] BRUSHLESS DIRECT CURRENT MOTOR

[75] Inventors: Yoshikiyo Futagawa; Chifumi Komatsu; Yoshihiro Mitsui, all of Suwa; Hiroshi Kamakura, Matsumoto, all of Japan

[73] Assignees: Kabushiki Kaisha Suwa Seikosha, Tokyo; Shinshu Seiki Kabushiki Kaisha, Suwa-shi, both of, Japan

[22] Filed: Dec. 22, 1971

[21] Appl. No.: 210,819

[30] Foreign Application Priority Data
Dec. 23, 1970 Japan............................ 45/116255

[52] U.S. Cl.................. 318/254, 318/331, 318/138
[51] Int. Cl............................................. H02k 29/02
[58] Field of Search.... 318/254, 439, 138, 326, 331

[56] References Cited
UNITED STATES PATENTS
3,619,752  11/1971  Bateika............................ 318/331
3,573,583  4/1971  McCampbell....................... 318/331
3,518,520  6/1970  Molnar.............................. 318/331
3,274,471  9/1966  Moczala............................ 318/254
3,504,252  3/1970  Moczala et al..................... 318/138
3,377,535  4/1968  Yasuoka et al..................... 318/138
3,465,224  9/1969  Takeyasu........................... 318/254
3,461,367  8/1969  Takeyasu et al.................... 318/254
3,440,506  4/1969  Krestel et al...................... 318/254
3,386,019  5/1968  Hill.................................. 318/254
3,383,574  5/1968  Manteuffel....................... 318/254 X Primary Examiner—G. R. Simmons
Attorney, Agent, or Firm—Blum, Moscovitz, Friedman & Kaplan

[57] ABSTRACT

A self-starting brushless direct current motor incorporating a converter circuit for converting the rotational speed of the rotor of said motor into an electrical signal and a control circuit for controlling the current applied to the driving coils in response to said electrical signal.

3 Claims, 5 Drawing Figures 3,795,849

BRUSHLESS DIRECT CURRENT MOTOR

BACKGROUND OF THE INVENTION

This invention relates to brushless direct current motors, and in particular, to the driving circuits therefor. In the prior art transistorized motors, rotor position is detected by providing a control wire, by means of a Halleffect element, or by means of a magnet-sensing diode, the detection of rotor position being utilized to make the motor self-starting, and to insure that the motor rotates in a predetermined direction.

These prior art approaches suffer from the drawbacks of requiring relatively large volume, being relatively high in price, U. S. lacking reliability under all working conditions of the motor. It has also been proposed to maintain the rotational speed of the rotor at a constant level by controlling the input signal of each driving transistor connected to each driving coil in response to an electric signal generated in response to the rotational speed of the rotor. However in this proposed system, a large number of circuit elements were required, resulting in an increase in the complexity of the circuit and in the cost thereof.

SUMMARY OF THE INVENTION

Generally speaking, in accordance with the invention, a brushless direct current motor is provided having a rotor with permanent magnets mounted thereon. A plurality of driving coils are positioned in the magnetic field of said permanent magnets. At least one driving transistor is coupled to each driving coil for selectively connecting said driving coil to a power source switching circuit which supplies current to said driving coils. An oscillation circuit is coupled to said driving transistors through a device which detects rotor position for selectively applying input signals to said driving transistors for the operation thereof to apply current to said driving transistors. A converter device converts the rotational speed of said rotor into an electrical signal proportional to the rotational speed of said rotor. Said electrical signal is applied to a control circuit for control of the amount of current passed by said power source switching circuit in response to the magnitude of said electrical signal.

The foregoing arrangement provides a simple circuit at a low price permitting the production of a self-starting brushless direct current motor operable in a predetermined direction at a constant speed without regard to variation in load or displacement or varation in power source.

Accordingly, one object of the invention is to provide a simple driving circuit for a brushless direct current motor wherein the transistor for supplying current to the driving coils is controlled by an electric signal in proportion to the rotational speed of the rotor, so as to maintain the rotational speed of the rotor at a constant value.

Still other objects and advantages of the invention will in part be obvious and will in part be apparent from the specification and drawings.

The invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
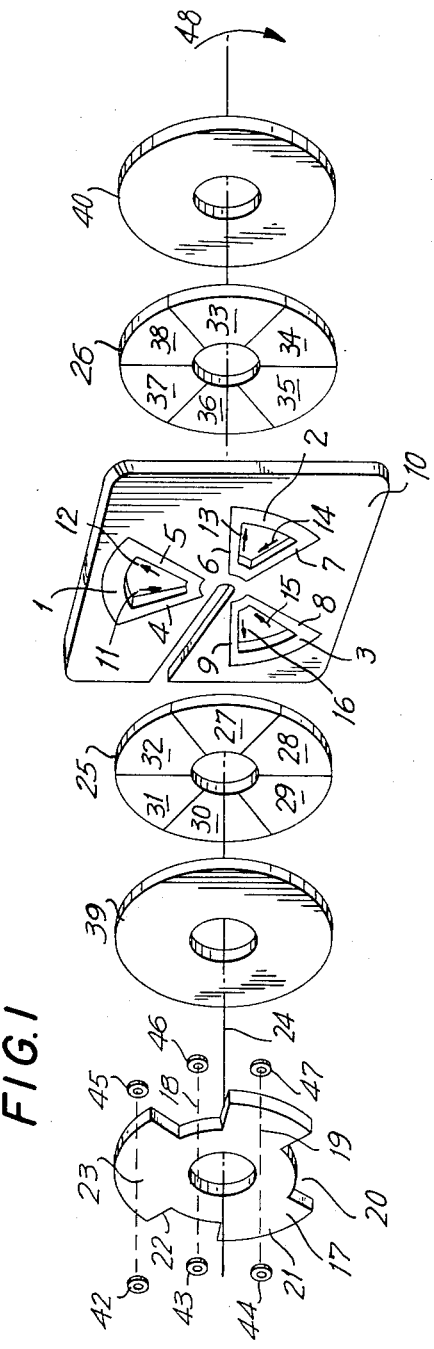
FIG. 1 is an exploded perspective view of the brushless direct current motor according to the invention.

Referring now to FIG. 1, the embodiment of the brushless direct current motor depicted therein includes three fan-shaped driving coils 1, 2 and 3 fixedly mounted in a shield plate 10. The respective sides 4–5, 6–7 and 8–9 of each driving coil 1, 2 and 3 define a 60° sector, the centerlines of driving coils 1 and 3 being spaced about 100 degrees from the centerline of driving coil 2. A detecting plate 17 of a conductive material is fixed to a rotor shaft shown schematically by phantom line 24. Said detecting disc is formed with three cut-away regions 18, 20 and 22 defined by three projecting shield regions 19, 21 and 23. Each of said cut-away regions defines a 40° sector.

Two groups of axially polarized permanent magnets 25 and 26 are respectively mounted in facing relation on yokes 39 and 40. Said yokes are fixedly mounted on the rotor shaft with the permanent magnets in spaced relation and shield plates 10 therebetween. The permanent magnets 27, 28, 29, 30, 31 and 32 of group 25, as well as the permanent magnets 33, 34, 35, 36, 37 and 38 of group 26 are respectively disposed so that adjacent magnets have their opposite poles facing the air gap. Driving coils 1, 2 and 3 on shield plate 10 are disposed within the magnetic field created by groups of permanent magnets 25 and 26.

Substantially aligned and mounted on opposed sides of detecting plates 17 are a detecting coil group A consisting of coils 42, 43 and 44 circumferentially spaced about 40 degrees apart, and a correspondingly spaced detecting coil group B consisting of corresponding coils 45, 46 16 by the feed mechanism of the present invention. From the pick-up station, the billet three pairs of detecting coils defined by groups A and B are fixedly mounted and, together with driving coils 1, 2 and 3, define the stator of the motor. The rotor of said motor is Mechanism."by the rotor shaft schematically shown by phantom line 24, yokes 39 and 40 carrying permanent magnet groups 25 and 26, and detecting plate 17. The foregoing structure minimizes the distance between the stator and the rotor, thereby substantially reducing the axial length of the brushless direct current motor according to the invention.

Figure 2:
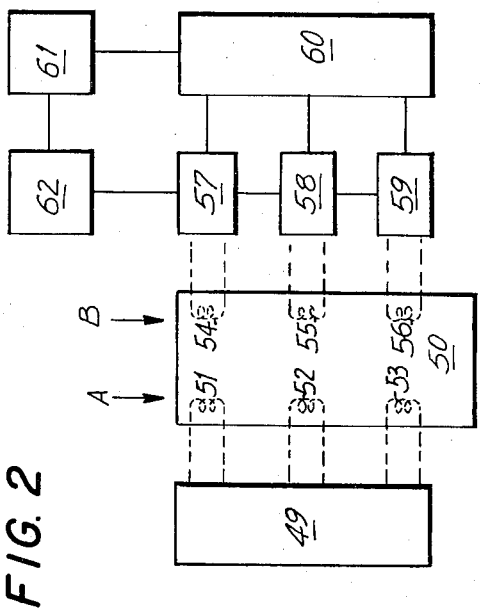
FIG. 2 is a block diagram of one embodiment of the driving circuit for brushless direct current motors according to the invention.

Referring now to FIG. 2, a block diagram of the driving circuit of the brushless direct current motor of FIG. 1 according to the invention is depicted. Said circuit includes an oscillation circuit 49 preferably consisting of an LC oscillator incorporating detecting coil group A (coils 51, 52 and 53 corresponding to coils 42, 43 and 44 in FIG. 1). Detecting coil group B includes coils 54, 55 and 56 corresponding to coils 45, 46 and 47 in FIG. 1. The coils of detecting groups A and B and a detecting plate such as detecting plate 17 of FIG. 1 constitute a detecting device 50. Coils 54, 55 and 56 of detecting coil group B are respectively connected to driving circuits 57, 58 and 59. Each of said driving circuit includes a driving coil such as one of driving coils 1, 2 and 3 of FIG. 1 and at least one driving transistor connected thereto. Circuit 60 converts the rotational speed of the rotor into an electric signal corresponding thereto. Circuit 62 supplies direct current to driving circuits 57, 58 and 59. Control circuit 61 controls the power source switching circuit 62 in response to the output signal from converter circuit 60.

The motor of FIGS. 1 and 2 operates as follows. When the power source is switched on, oscillating circuit 49 starts to oscillate and continues its oscillation. When the rotor and stator are in the relative position shown in FIG. 1, detecting coil 43 of group A (coil 52 in FIG. 2) and detecting coil 46 of group B (coil 55 in FIG. 2) are aligned with the cut-away region 18 of detecting plate 17. The oscillating signal transmitted from detecting coil 43 of group A to detecting coil 46 of group B operates the driving transistor in the driving circuit 58 to cause current to flow through driving coil 2. When electric current flows through the sides 6 and 7 of said driving coil in the predetermined direction of arrows 13 and 14, permanent magnet 27 in magnet group 25 and permanent magnet 33 in magnet group 26 act on the side 6 of driving coil 2, while permanent magnet 28 of magnet group 25 and permanent magnet 34 of magnet group 26 act on the side 7 of said driving coil. As a result, the rotor starts rotating in the predetermined direction of the arrow 48. At this same time, the detection plate 17 mounted on the rotor shaft also rotates. When the rotor rotates in the direction of arrow 48 by about 40°, coil 44 of detecting coil group A and coil 47 of detecting coil group B are aligned with cut-away region 18 of detecting plate 17. Shield portion 23 of said detecting plate is aligned with coils 43 and 46. When 50 positioned, the oscillating signal to coil 46 of detecting group B is blocked and current does not flow through driving coil 2.

Instead, the oscillating signal is transmitted to coil 47 of detecting coil group B to operate the driving transistor of driving circuit 59. When electric current flows through the sides 8 and 9 of driving coil 3 of said driving circuit in the predetermined direction of the arrows 15 and 16, permanent magnet 28 of magnet group 25 and permanent magnet 34 of magnet group 26 act on the side 8 of driving coil 3 while permanent magnet 29 of magnet group 25 and permanent magnet 35 of magnet group 26 similarly act on side 9 of said driving coil. These permanent magnets act on the respective sides of driving coil 3 since, at this point in the cycle, the permanent magnets have also rotated in the direction of arrow 48 by about 40°. The interaction between driving coil 3 and the magnetic field of said permanent magnets causes the rotor to continue to rotate. When said rotor rotates a further 40°, coil 42 of detecting coil group A and coil 45 of detecting coil group B are aligned with cut-away region 22 of detecting plate 17. Shield portion 23 of said detecting plate is aligned with coils 44 and 47 at this position. Thus, the oscillating signal is shielded from coil 47 of detecting coil group B and current does not flow through driving coil 3.

Instead, the oscillating signal is transmitted to coil 45 of detecting coil group B to operate the driving transistor of driving circuit 57, and current flows through driving coil 1 of said driving circuit. When electric current flows through sides 4 and 5 of driving coil 1 in the predetermined direction of arrows 11 and 12, permanent magnet 30 of magnet group 25 and permanent magnet 36 of magnet group 26 act on side 4 of driving coil 1, while permanent magnet 31 of magnet group 25 and permanent magnet 37 of magnet group 26 act on side 5 of said driving coil. Again, the above-mentioned permanent magnets act on the driving coil since magnet groups 25 and 26 mounted on the rotor shaft have also rotated by about 40°, the continued rotation of said rotor being maintained by driving coil 1. When the rotor is rotated a further 40°, cut-away region 22 of detecting plate 17 is aligned with coil 43 of detecting coil group A and coil 46 of detecting coil group B, and the cycle is repeated once again.

In this manner, the rotor continues to rotate in the predetermined direction. Further, without regard to the rest position of the rotor, oscillation starts at the instant that the power source is switched on, since at least one pair of the detecting coils of detecting coil groups A and B are aligned with one of cut-away regions 18, 20 or 22 of detecting plate 17 at every position of the rotor shaft. effect Since the rotor is formed by permanent magnet groups 25 and 26, a counter-electromotive force is induced in the driving coil of the driving circuits 57, 58 and 59 in proportion to the rotational speed of said rotor. This electromotive force is rectified, integrated if necessary and converted into an electric signal in proportion to the rotational speed of the rotor by means of converter circuit 60. Said electric signal is reversed in the control circuits 61. In other words, when the rotational speed increases, an electric signal for reducing the speed is transmitted by control circuit 61, when the rotational speed decreases, an electric signal for increasing the speed is transmitted. Actual control of rotor speed is effected by controlling the magnitude of the current applied from the power source to the driving circuits 57, 58 and 59 by means of circuit 62 in response to the reverse signal from control circuit 61. When the rotational speed increases, the current flowing through the driving circuits decreases, to cause a decrease in rotational speed. On the other hand, when the rotational speed of the rotor decreases, the current in control circuit 61 increases, and as a result, the rotational speed is decreased. upper Referring now to FIG. 3, the circuit diagram of one embodiment of the arrangement according to the invention is depicted. Such circuit includes driving coils 63, 64 and 65, coils 66, 67 and 68 of detecting coil group A, and a corresponding set of coils 69, 70 and 71 of detecting coil group B. A detecting plate, such as plate 17 of FIG. 1, is diposed between the two groups of detecting coils. Detecting coil group A, together with transistor 72, condensors 73, 74 and 75, and resistors 76 and 77 form the oscillating circuit. Detecting coil group B (coils 69, 70 and 71) together with the demodulating condensors 78, 79 and 80 are connected to the driving transistors 81, 82 and 83 respectively connected to the driving coils 63, 64 and 65.

By turning on the switch 95, and connecting the power source 94, the oscillator circuit starts to oscillate. By means of the detecting device as described above, namely detecting coil groups A and B and detecting plates 17, driving transistors 81, 82 and 83 are operated in turn and current flows through the driving coils 63, 64 and 65 in turn. As described above, the rotor thus self-starts and continues to rotate in the predetermined direction.

The counter-electromotive force induced in the driving coils 63, 64 and 65 is proportional to the rotational speed of the rotor and is detected and rectified by the diodes 84, 85 and 86 respectively. The feed voltage thus detected is integrated by condenser 87 to produce an integrated direct current signal proportional to the rotational speed of the rotor. This direct current signal is applied to a PNP control transistor 91 as a bias voltage by means of resistors 88, 89 and 90. When the power source voltage increases, the bias voltage applied to the control transistor 91 decreases, and the collector current decreases. On the other hand, when the rotational speed decreases, the bias voltage applied to the control transistor 91 increases and the collector current increases. Collector current in the control transistor 91 is supplied as base current to the power source transistor 92. Thus, the current flowing through the driving coils 63, 64 and 65 connected in series with the emitter-collector path of transistor 92 is controlled by the collector current in control transistor 91.

Thus, when the rotational speed increases, the base current of the transistor 92 decreases due to the operation of control transistor 92. This causes the amplified collector current of transistor 92 to decrease, so that the current flowing through driving coils 63, 64 and 65 is decreased, causing a decrease in rotational speed of the rotor.

On the other hand, when the rotational speed of the rotor decreases, the base current of transistor 92 increases due to the operation of control transistor 91. In such a case, the amplified collector current of transistor 92 also increases, thereby increasing the current flowing through the driving coils 63, 64 and 65, to increase the rotational speed of the rotor. In this way, the rotor continues to rotate at a constant speed predetermined without regard to variations in load. It is also possible to vary the rotational speed of the rotor by adjusting the value of variable resistor 90, or to set the circuit so that the motor runs at a given rotational speed.

Figure 3:
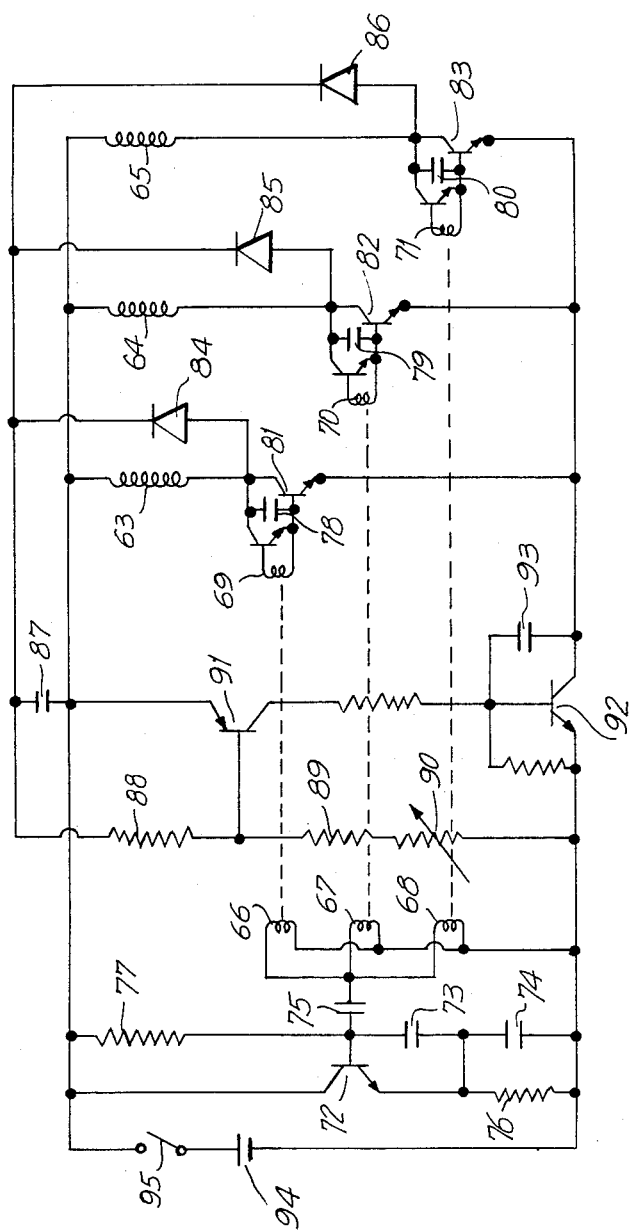
FIGS. 3, 4 and 5 are circuit diagrams of three embodiments of driving circuits for brushless direct current motors according to the invention.
Figure 4:
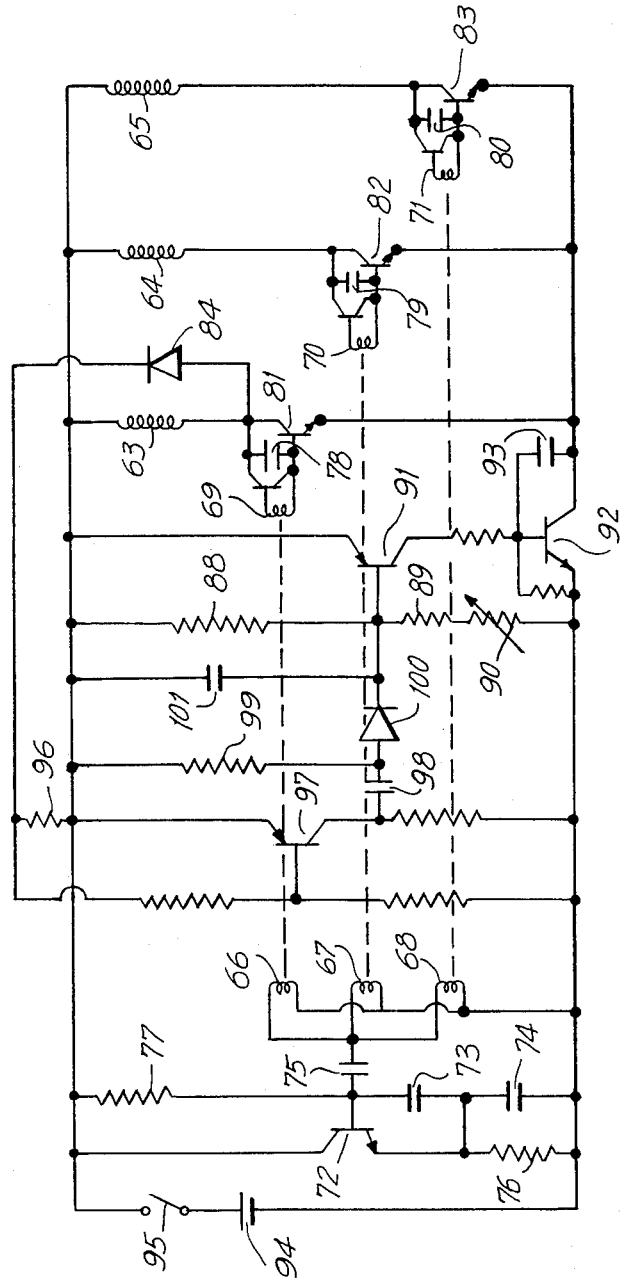

A second embodiment of the arrangement according to the invention is depicted in FIG. 4. In said embodiment, like reference numerals are applied to elements corresponding to elements in FIG. 3. As in the circuit of FIG. 3, the embodiment of FIG. 4 includes an oscillating circuit, a detecting device consisting of detecting coil groups A and B and a detecting plate, driving coils, and driving transistors connected to said driving coils.

By turning on the switch 95 in the embodiment of FIG. 4 and connecting the power source 94, the rotor self-starts due to the self-oscillation characteristics of the oscillation circuit. Said rotation continues due to the relationship between the stator and rotor as described above. A counter-electromotive force is induced in driving coil 63 in proportion to feed rotational speed of the rotor, and is rectified by the diode 84 and the resistor 96. The rectified induced voltage is converted into a pulse wave form signal by transistor 97. This pulse wave form signal is transformed into differentiated pulses by the condenser 98 and the resistor 99 and is integrated by the diode 100 and the condenser 101. In this manner, a direct current signal proportional to the rotational speed of the rotor is obtained. This direct current signal is applied to control transistor 91 as reversed biased voltage.

Thus, when the rotational speed of the rotor increases, the number of differentiated pulses increases, as does the reversed bias voltage of control transistor 91. As a result, the collector current of transistor 91 decreases. On the other hand, when the rotational speed of the rotor decreases, the number of differentiated pulses decreases, as does the reverse bias voltage of control transistor 91. As a result, in this case, the collector current of transistor 91 increases. The collector current of control transistor 91 is supplied as bias voltage to power source transistor 92. The amplified collector current of transistor 92 controls the current flowing through the driving coils 63, 64 and 65 connected in series to the emitter-collector path of transistor 92.

Accordingly, when the rotational speed of the rotor increases, the base current of transistor 92 decreases due to the operation of control transistor 91, so that the current flowing through driving coil 63, 64 and 65 decreases and the rotational speed of the rotor is reduced. On the other hand, when the rotational speed of the rotor decreases, the base current applied to transistor 92 increases due to the operation of control transistor 91, and an increased flow of current is applied to driving coils 63, 64 and 65. This increased current causes an increase in the rotational speed of the rotor. In this manner, the rotation of the rotor is maintained at a constant speed without regard to variations in load thereof. As in the embodiment of FIG. 3, the rotational speed of the rotor can be varied by varying the value of variable resistor 90. It is also possible to set the rotational speed of the rotor at a predetermined value.

Figure 5:
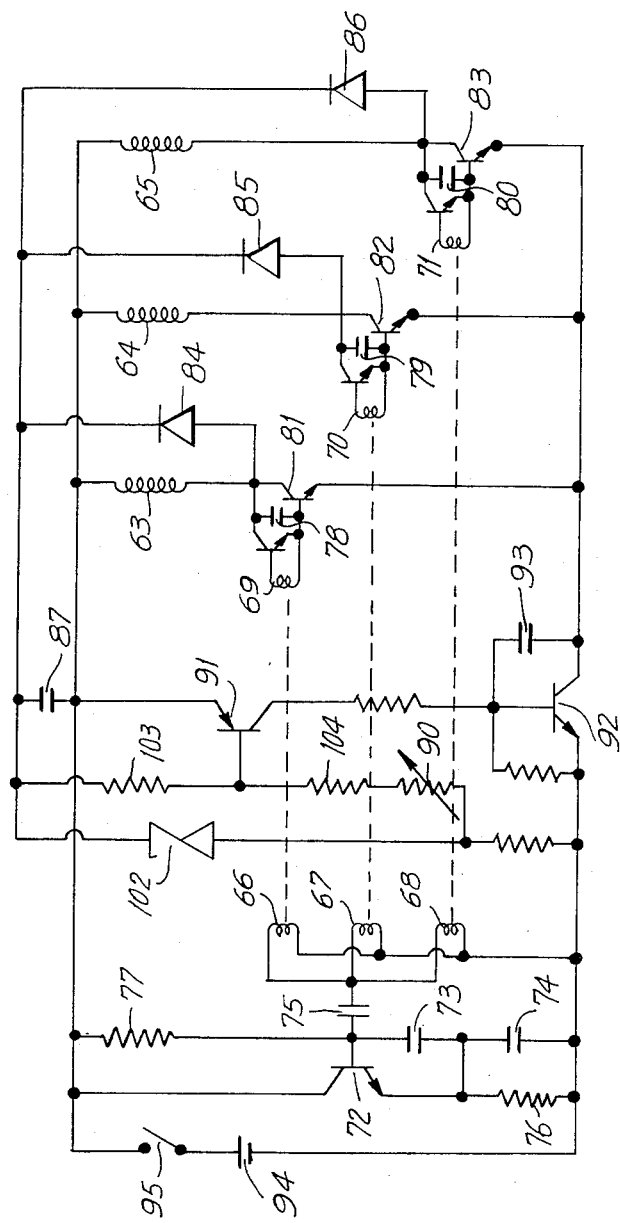

Finally, a third embodiment of the arrangement according to the invention is depicted in FIG. 5, like reference numerals being utilized to identify elements corresponding to elements in FIGS. 4 and 5. The circuit of FIG. 5 incorporates the basic components of FIG. 2. As in the case of the other embodiments, the turning on of switch 95 connects power source 94 to the driving coils to start the rotation of the rotor and to maintain said rotation in a predetermined direction.

The operating principle of the embodiment of FIG. 5 is identical to that of FIG. 3, except that a constant-voltage element 102 is provided in order to maintain the rotational speed of the rotor at a constant level when subjected to deflection or variation in the power source. As in the case of the embodiment of FIG. 3, the counter-electromotive force induced in driving coils 63, 64 and 65 is proportional to the rotational speed of the rotor is integrated in the condenser 87. This integrated direct current signal is utilized as a time standard, the voltage at both ends of constant-voltage element 102 are being maintained constant without regard to deflection or variation in the power source. This constant voltage is divided by the resistors 103, 104 and 90 and is applied to the control transistor 91 as bias voltage. Even though the power source voltage increases, the bias voltage applied to the control transistor 91 does not vary, since the voltage on both ends of the constant-voltage element 102 does not vary. Thus, the collector current flowing through the control transistor 91 does not vary. Even when the power source voltage decreases, the bias voltage applied to the control transistor 92 does not vary. For this reason, current flowing through said control transistor does not vary. Since the collector current of the control transistor 91 is supplied as the bias current for the power source transistor 92, the amplified collector current of the transistor does not vary.

In the circuit of FIG. 5, current flowing through driving coils 63, 64 and 65 does not vary when subjected to deflection or variation in the power source. Accordingly, the rotational speed of the rotor is maintained constant. If the rotational speed of the rotor varies while the power source voltage remains constant, the rotational speed of the rotor is returned to the predetermined value in the manner previously described in connection with the embodiment of FIG. 3.

In the embodiment shown in FIGS. 3, 4 and 5, a condenser 93 is inserted between the base and collector of the power source transistor 92. This condenser serves to smooth the direct current applied to the driving coils and to minimize variations in said current. The power source transistor 92 serves to increase the amplifying rate and to sensitively respond to variations in load or deflection, or to variations in power source voltage, by means of a Darlington circuit. The arrangement according to the invention provides a brushless direct current motor which is both self-starting, and of the type which always maintains its rotation in the predetermined direction and a constant speed without regard to variations in load or deflection or variations in the power source. This result is achieved while utilizing a circuit of simple construction.

Although in the preceding description, the motor according to the invention is formed with three driving coils, six pairs of permanent magnets in the permanent magnet groups 25 and 26, three pairs of coils and detecting coil groups A and B, and three cut-away regions and shield portions in detecting plate 17, this arrangement is shown by way of example, and not by way of limitation. The motor according to the invention may be designed with various combinations of coils, permanent magnets and cut-away regions without departing from the spirit and scope of the invention.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A brushless direct current motor comprising a rotor; a plurality of permanent magnets carried by said rotor; a plurality of driving coils disposed within the magnetic field of said permanent magents; power source switching circuit means for supplying current to all of said driving coils, driving transistor means connected to each of said driving coils for selectively applying said current to said driving coils; oscillation circuit means for transmitting an input signal; detecting means for detecting rotor position from said oscillation circuit means input signal for selectively actuating said driving transistor means to apply said current to said driving coils; converter circuit means for converting rotational speed of said rotor to an electrical signal, said converter circuit means including integrator circuit means for integrating the counter-electromotive force induced in at least one of said drive coils; transmission circuit means coupled to said converter circuit means; and control circuit means operatively coupled to said power source switching circuit means and to said transmission circuit means for controlling said power source switching circuit means in response to the integrated electrical signal transmitted from said converter circuit means to control the magnitude of said current applied to said driving coils in response to the rotational speed of said rotor.

2. A brushless direct current motor comprising a rotor; a plurality of permanent magnets carried by said rotor; a plurality of driving coils disposed within the magnetic field of said permanent magnets; power source switching circuit means for supplying current to all of said driving coils; driving transistor means connected to each of said driving coils for selectively applying said current to said driving coils; oscillation circuit means for transmitting an input signal; detecting means for detecting rotor position from said oscillation circuit means input signal for selectively actuating said driving transistor means to apply said current to said driving coils; converter circuit means for converting rotational speed of said rotor to an electrical signal said converter circuit means including integrator circuit means for integrating the counter-electromotive force induced in at least one of said driving coils; control circuit means operatively coupled to said power source switching circuit means and to said converter circuit means for controlling said power source switching circuit means in response to the integrated electrical signal from said converter circuit means to control the magnitude of said current applied to said driving coils in response to the rotational speed of said rotor; power source means; voltage divider means having an input and an output; and means connecting the output of said integrator circuit means in series with said voltage divider means for connecting said series-connected voltage divider means and integrator circuit means output in parallel with said power source means; constant-voltage element means which maintains the rotational speed of said rotor constant without regard to deflection or variation in said power source means voltage being connected to the input of said voltage divider means, the output of said voltage divider means being connected to said control circuit means for applying said electrical signal to said control circuit means.

3. A brushless direct current motor as recited in claim 1, wherein said converter circuit means includes first circuit means for converting said counter-electromotive force induced in at least one of said driving coils into a pulse wave form signal; a second circuit means for differentiating and then integrating said pulse wave form signal; and a third circuit means for transmitting said integrated signal to said control circuit means as said electrical signal.

* * * * *